Figure 1:
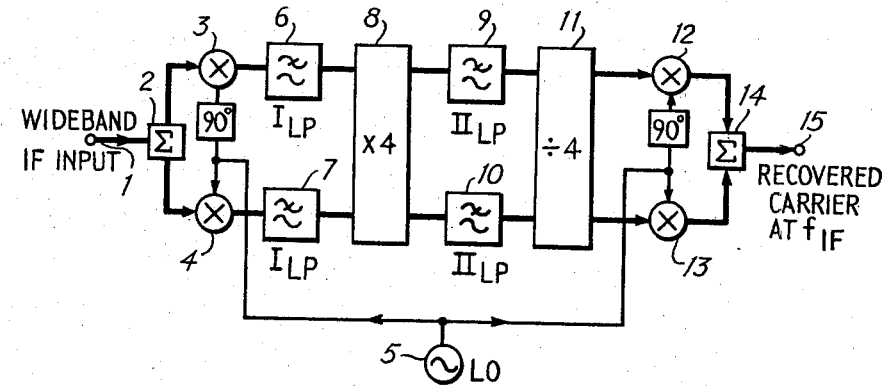

United States Patent [19]

Mogensen

[11] 4,318,049
[45] Mar. 2, 1982

[54] CARRIER RECOVERY CIRCUIT FOR USE IN A MULTI-LEVEL PHASE SHIFT KEYING DEMODULATOR

[75] Inventor: Gregers E. Mogensen, Lyngby, Denmark

[73] Assignee: The Marconi Company Limited, Chelmsford, England

[21] Appl. No.: 12,726

[22] Filed: Feb. 16, 1979
(Under 37 CFR 1.47)

[30] Foreign Application Priority Data

Feb. 17, 1978 [GB] United Kingdom ............... 6302/78

[51] Int. Cl.³ ................................................ H03D 3/18
[52] U.S. Cl. .................................... 329/50; 329/104; 329/122; 375/86
[58] Field of Search ............... 329/50, 104, 122, 124; 375/83-87, 94

[56] References Cited

U.S. PATENT DOCUMENTS 3,638,125  1/1972  Goell ........................... 329/124 X
3,835,404  9/1974  Nakamura et al. ............. 375/86 X

*Primary Examiner*—Siegfried H. Grimm
*Assistant Examiner*—Edward P. Westin
*Attorney, Agent, or Firm*—Diller, Ramik & Wight

[57] ABSTRACT

In a demodulator for use with a multi-level phase shift keying (p.s.k.) signal having N phase levels, the p.s.k. signal which includes a carrier signal is frequency multiplied by a factor N in a multiplier filtered and frequency divided by the factor N to enable the carrier signal to be reconstituted at a terminal. To enable the demodulator to work at different data rates, and to enable filters to have sufficiently precise characteristics, the received p.s.k. signal is initially converted to base-band in mixers to which is applied a locally generated signal nominally at the carrier frequency.

7 Claims, 7 Drawing Figures

CARRIER RECOVERY CIRCUIT FOR USE IN A MULTI-LEVEL PHASE SHIFT KEYING DEMODULATOR

This invention relates to demodulators and is primarily applicable to demodulators used in modems of the kind which handle multi-level phase shift keying signals. The present invention seeks to provide an improved demodulator.

According to this invention, a demodulator for use with a multi-level phase shift keying signal having N phase levels includes means for mixing the p.s.k. signal with a locally generated signal having a frequency nominally the same as the p.s.k. signal to generate a base-band signal, means for frequency multiplying by a factor N components of the base-band signal, filter means for removing high frequency components from said frequency multiplied signal, means for frequency dividing said filtered signal or signal derived therefrom by a factor of N, and means for mixing said divided signal with said locally generated signal or the signal derived therefrom.

When the said divided signal is mixed with said locally generated signal the original carrier frequency of the p.s.k. signal is recovered. It is necessary to recover the carrier frequency to enable clock signals to be recovered from the received p.s.k. signal, which in turn enables the p.s.k. signal to be demodulated and the data signals reconstituted. If instead of mixing said divided signal with said locally generated signal, it is mixed with a signal derived therefrom which additionally contains signal components representative of the received p.s.k. signal it is possible to obtain signals representative of the required clock signals and data signals without the need to generate a reconstituted carrier frequency as a separate step.

Preferably, the p.s.k. signal is split into two portions of equal power, one portion being mixed directly with said locally generated signal, and the other portion being mixed with said locally generated signal after said locally generated signal has undergone a relative phase shift of 90°.

Preferably again, the two quadrature signals so produced as a result of the mixing are passed through low pass filters to remove the upper side band signals introduced by mixing before they are frequency multiplied by the factor of N.

Preferably yet again, the two signals are passed through further low pass filters to remove, or at least attenuate, signals which are not representative of a multiple N of the carrier frequency of the p.s.k. signals.

The filtered signals can then be frequency divided by a factor N direrctly, but this can be difficult to arrange since only low frequencies are present, and instead, preferably the filtered signals are mixed with high frequency signals prior to division. Typically, these high frequency signals will be in excess of 1 MHz.

Figure 2:
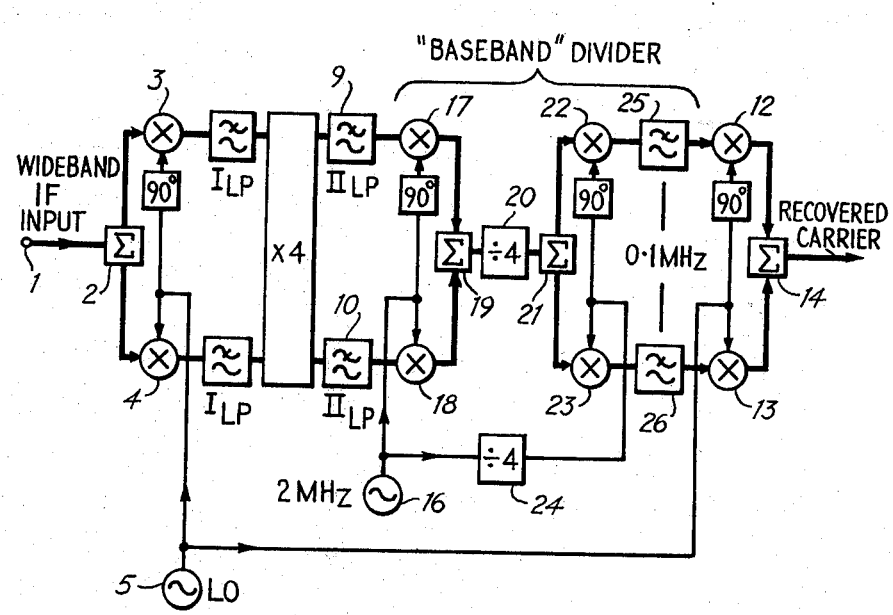
Figure 3:
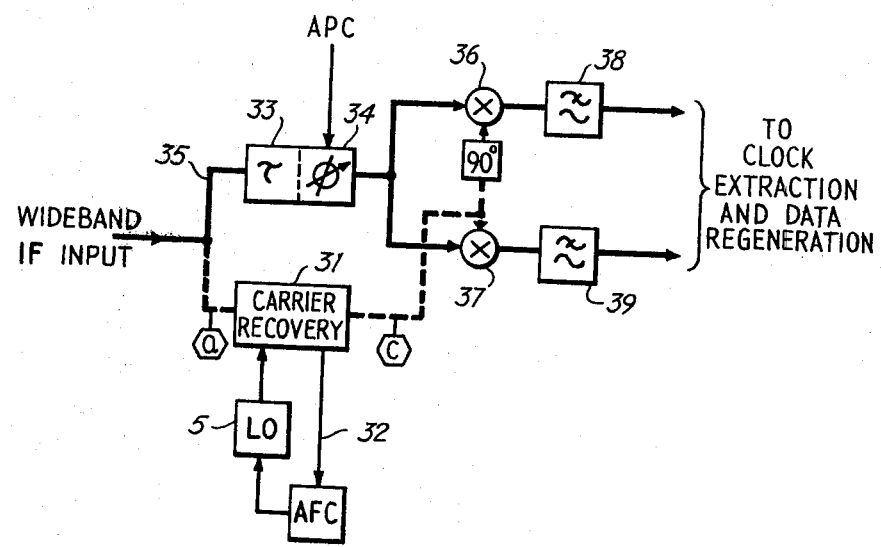
Figure 4:
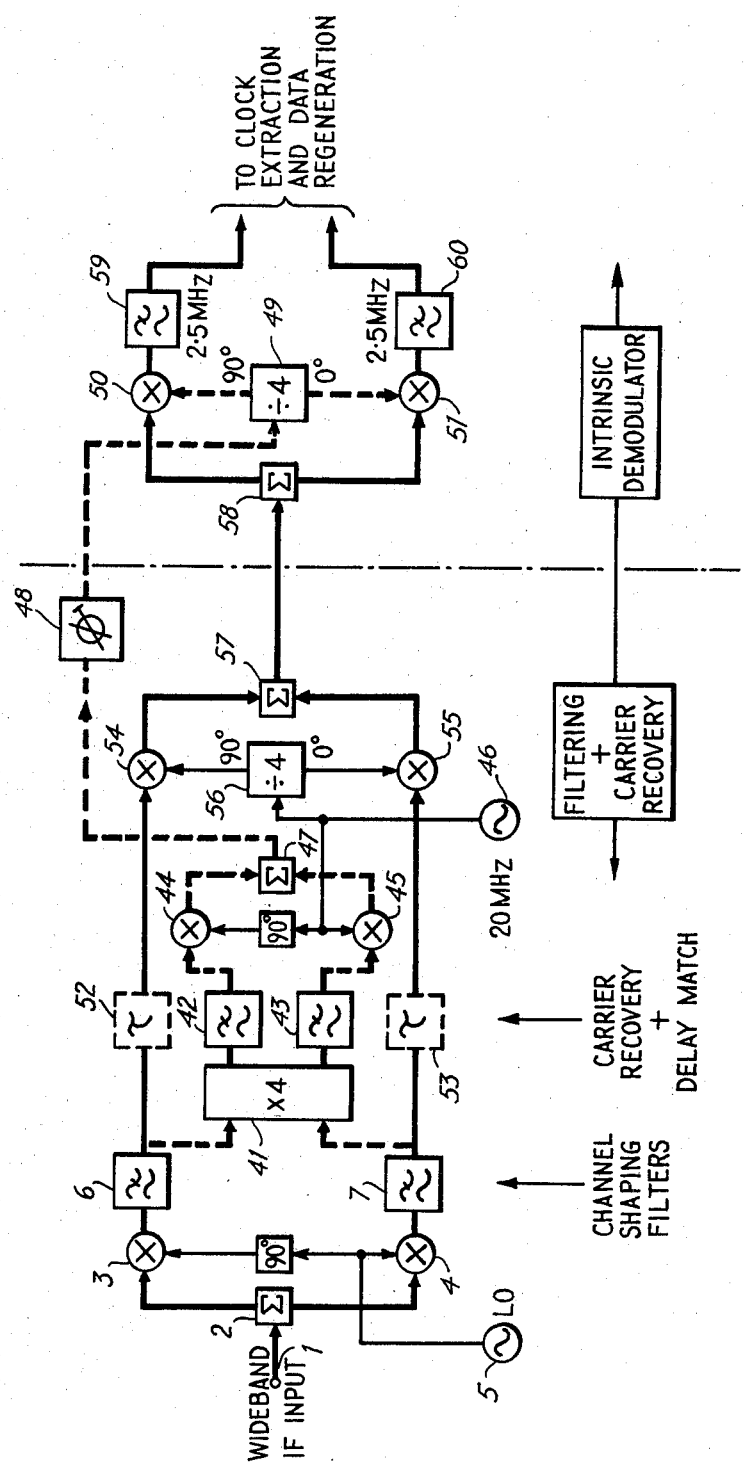
Figure 5:
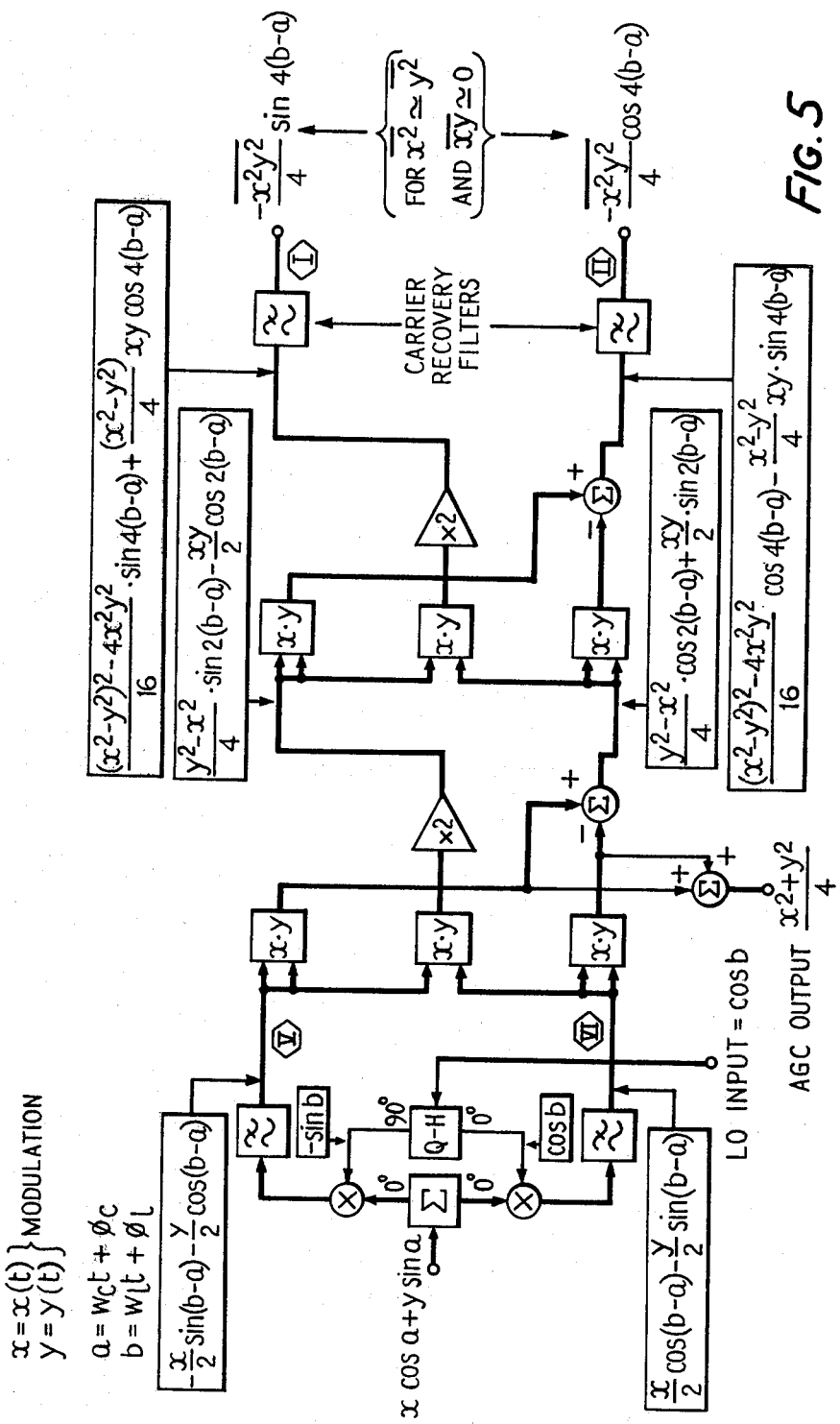
Figure 6:
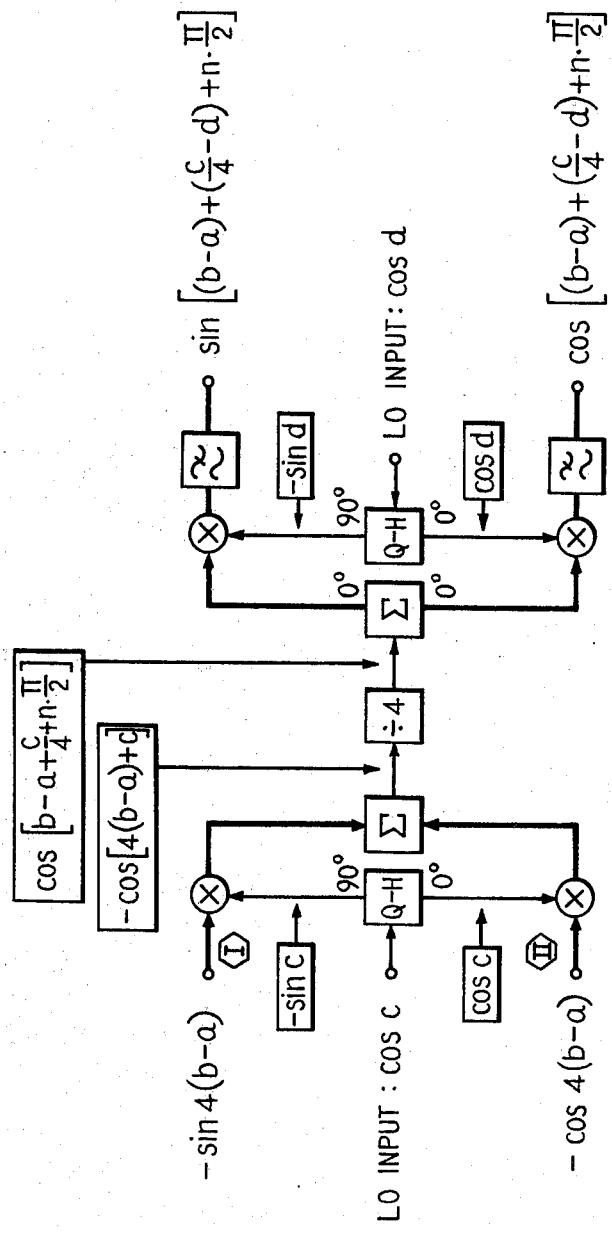
Figure 7:
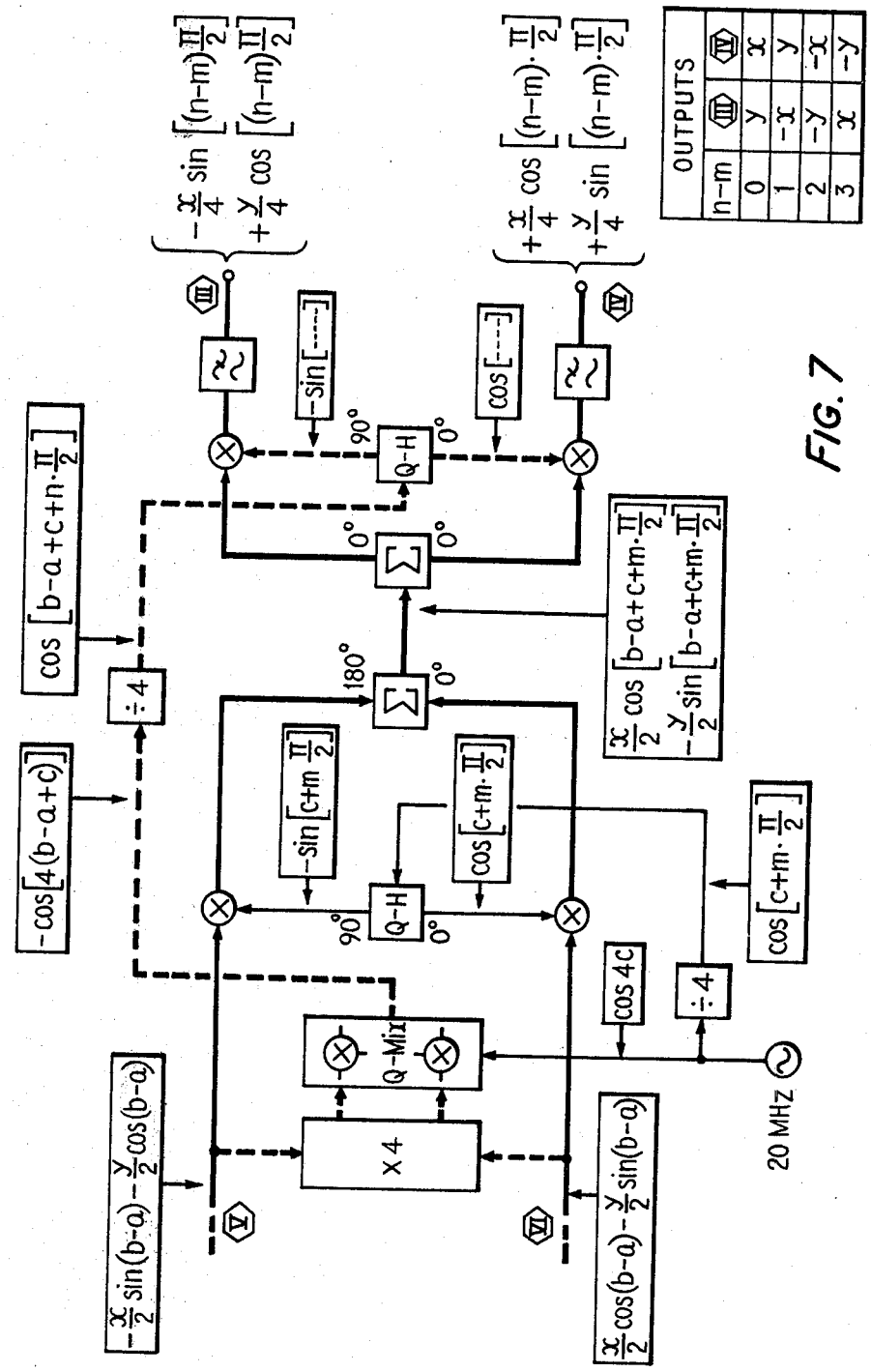

The invention is further described, by way of example, with reference to the accompanying drawings in which, FIG. 1 illustrates the most basic form of part of a demodulator in accordance with the present invention, FIG. 2 illustrates a modified form of the circuit shown in FIG. 1, FIG. 3 shows the use of the circuits illustrated in FIGS. 1 or 2 for using the recovered carrier signal to facilitate clock extraction and data re-generation, FIG. 4 shows a modified circuit arrangement having improved electrical properties, FIGS. 5 and 6 are explanatory diagrams referring to frequency multiplication and division circuits of FIG. 2, and FIG. 7 is an explanatory diagram relating to FIG. 4.

Referring to FIG. 1, there is shown therein a circuit which is capable of extracting a carrier frequency from a received wide-band signal carrying phase shift keying signals. The input signals are applied to a terminal 1 which is connected to a power splitter 2 which divides the power equally and routes it to a pair of mixers 3 and 4. The second inputs of the mixers 3 and 4 receive signals from a local oscillator 5 having a frequency which is nominally the same as the carrier frequency of the input signal. The signal from the local oscillator 5 is applied directly to the mixer 4, but undergoes a phase shift of 90° before it is applied to mixer 3. The outputs of the mixers 3 and 4 are passed through respective low pass filters 6 and 7 arranged to pass only the difference signals generated by the mixers. The sum signals are attenuated. Consequently, base-band signals are provided at the output of the two filters and these signals are applied to a frequency multiplier 8 which, in this case, provides a frequency multiplication factor of 4. It is assumed that the incoming signal has four phase levels and by multiplying the frequency components in the base-band signal by a factor of 4, the modulation components are removed, leaving signals representative of the carrier frequency and phase. The multiplied frequencies are applied to a further pair of low pass filters 9 and 10 which remove unwanted harmonics and signal components introduced by the frequency multiplication process. The filtered signals are frequency divided in a divider circuit 11 which produces a frequency division by a factor of 4. The divided signals are passed to a further pair of mixers 12 and 13 where they are mixed with the signal from the local oscillator 5. The signal from the local oscillator 5 is applied directly to the mixer 13, but undergoes a phase shift of 90° before it is applied to the mixer 12. The effet of the mixers 12 and 13 is to re-convert the signals representative of the carrier frequency to the same frequency as they had at the input terminal 1. On re-combination of these two signals at a combining circuit 14, the carrier frequency is recovered and provided at a terminal 15. Once the carrier frequency has been recovered it can be used to generate a clock signal and to extract the modulated data from the received signal.

The circuit shown in FIG. 1 is difficult to implement, since the frequency divider 11 is required to frequency divide base-band signals which, by definition, include very low frequency components including D.C. levels. A more practical circuit is shown in FIG. 2 and it will be seen that the front end of this circuit is very similar to FIG. 1. However, an arbitrary high frequency, in this case 2 MHz, from a signal source 16 is applied to the mixers 17 and 18 which follow the low pass filters 9 and 10. Again, the signal from the frequency source 16 undergoes a phase shift of 90° before it is applied to the mixer 17. The two frequencies centred on 2 MHz which are provided at the outputs of the mixers 17 and 18 are combined in a combining circuit 19 and then frequency divided by a factor of 4 in a frequency division circuit 20. However, since this frequency division circuit is dividing frequencies centred on 2 MHz instead of at D.C., as was the case in FIG. 1, it can be implemented in a fairly straight forward manner using known digital frequency division techniques. The frequency divided circuit is split at a power splitter 21 and applied to a pair of further mixers 22 and 23 where they are combined with a signal derived from the signal source 16. It will be noted that the signal is also divided by a factor of 4 in a further frequency divider 24 and is applied directly to the mixer 23 and via a 90° phase shifter to the mixer 22. The lower side bands of the mixed signals are passed by a pair of low pass filters 25 and 26 having cut-off frequencies of the order of 0.1 MHz. The filtered signals are then applied to two mixers 12 and 13 which correspond to the mixers shown in FIG. 1. At these mixers, the signal from the local oscillator 5 is re-inserted and the recovered carrier frequency is obtained at the output of the combining circuit 14, as before.

The way in which the circuits shown in FIGS. 1 and 2 can be used to produce a clock signal and to re-generate the modulated data is shown diagrammatically in FIG. 3 in which the circuits shown in FIGS. 1 and 2 are termed carrier recovery circuit 31. This circuit is provided with an automatic frequency control loop 32 which controls the local oscillator 5 so that it tracks the recovered carrier frequency. The carrier recovery circuit 31 inevitably introduces some delay and overall phase shift. To compensate for this, delay and phase shift circuits 33 and 34 are provided in a signal path 35. The p.s.k. signals are applied to a further pair of mixers 36 and 37 which also receive the recovered carrier frequency. Mixer 37 receives this frequency directly, but the signal applied to mixer 36 undergoes a phase shift of 90°. After the mixed signals are passed through a pair of low pass filters 38 and 39 they are passed to clock extraction and data re-generation circuits which are not illustrated here since they can be conventional. The circuit configuration shown in FIG. 3 may not be wholly satisfactory, since it is possible that signals from the local oscillator 5 will leak into the demodulator circuit consiting of mixers 36 and 37. This is most undesirable, since it could create co-channel interference. Additionally, it is desirable to achieve the fastest possible acquisition of the carrier frequency or, alternatively, for a given acquisition time to minimize the phase jitter of the recovered carrier frequency. This requires the insertion of a delay in the signal path 35 to match the delay inherently present in the carrier recovery circuit 31. This can be very difficult to arrange satisfactorily in the circuit illustrated.

With these difficulties in mind, an alternative circuit configuration has been developed which is shown in FIG. 4 in which the recovery of the carrier frequency is performed integrally with the demodulaton of the received wide-band p.s.k. signal. The front end of this circuit is similar to that shown in FIG. 1 and contains the same input terminal 1, power splitter 2, mixers 3 and 4, local oscillator 5 and filters 6 and 7. The output from filters 6 and 7 is routed to a frequency multiplier 41 which provides a factor of 4 frequency multiplicaton. The outputs are passed through a pair of low pass filters 42 and 43 which leave only the base-band signals which, in turn, are mixed at mixers 44 and 45 with a 20 MHz signal obtained from a further oscillator 46. The signal from the oscillator 46 is applied directly to mixer 45, but undergoes a phase change of 90° before it is applied to mixer 44. The resulting frequencies from the mixers 44 and 45 which are centered on 20 MHz are combined in a summing circuit 47 and passed via an adjustable phase shifter 48 to a frequency division circuit 49 which provides a frequency division factor of 4. The divider 49 is such that it has two output terminals at which are obtained divided frequencies having a relative phase difference of 90°. These frequency divided signals are applied to further mixers 50 and 51.

The signals obtained from low pass filters 6 and 7 are also passed via delay circuits 52 and 53 to a pair of mixers 54 and 55. The function of the delay circuits 52 and 53 is to match the delay through the filters 42 and 43. The delay circuits can be implemented by the use of sampled delay lines of the charge coupled device (CCD) kind or equivalent. The delay can therefore be matched to a wide range of bandwidths as determined by the filters 42 and 43 very easily. Compensation for delays introduced by the multiplier 41 can also be effected in this way. The other inputs of these two mixers receive the signal from the oscillator 46 after the frequency has been divided by a factor of 4 in a second frequency divider 56. This frequency divieder also provides outputs having a relative phase shift of 90° which are applied to the mixers 54 and 55. After mixing, these signals are combined in a summing circuit 57 which produces a signal having a nominal frequency of 5 MHz. The signal so obtained is split at a power splitter 58 and applied to the two mixers 50 and 51. The carrier frequency is generated at divider 49, and is mixed with the signals at mixers 50 and 51 for the purpose of clock extraction and data re-generation as required. To remove the upper side bands produced by the mixers the signals are passed through low pass filters 59 and 60.

The way in which the circuits shown in the preceding Figures operate can be seen from the explanatory diagrams given in FIGS. 5, 6 and 7. In these Figures the various frequencies and phases present at different points in the circuits are marked so that the generation of particular frequencies and the associated phases can be followed through.

I claim:

1. In a demodulator for use with a multilevel phase shift keying signal having N phase levels, a carrier recovery circuit including mixing means for mixing the p.s.k. signal with a locally generated signal having a frequency nominally the same as the p.s.k. signal to generate two base-band signals in phase quadrature with each other, multiplier means for frequency multiplying by a factor N components of each base-band signal, filter means for removing high frequency components from said frequency multiplied signals, means for frequency dividing by a factor of N two respective signals derived from the output of the filter means and means for mixing each divided signal with a signal derived from said locally generated signal to generate a signal related to a carrier frequency of the p.s.k. signal to enable the p.s.k. signal to be demodulated.

2. A carrier recovery circuit as claimed in claim 1 and wherein means are provided for splitting the p.s.k. signal into two portions of equal power, one portion being mixed directly at said mixing means with said locally generated signal, and the other portion being mixed at said mixing means with said locally generated signal after said locally generated signal has undergone a relative phase shift of 90°.

3. A carrier recovery circuit as claimed in claim 2 and wherein respective low pass filters are provided in respective signal paths between said mixing means and said multiplier means so that the upper side band signals introduced into the two phase quadrature signals by the mixing means are removed before they are frequency multiplied by the factor of N.

4. A carrier recovery circuit as claimed in claim 3 and wherein said filter means are operative to remove, or at least attenuate, signal components in said two quadrature signals which are not representative of a multiple N of the carrier frequency of the p.s.k. signal.

5. A carrier recovery circuit as claimed in claim 4 and wherein further mixing means are provided for mixing the signal at the output of said filter means with high frequency signals prior to said frequency division.

6. A carrier recovery circuit as claimed in any one of the preceding claims, and wherein delay means are operative to delay signals carrying the p.s.k. modulation to compensate for delay introduced in the frequency multiplier means or the filter means for removing high frequency components from the frequency multiplied signal.

7. A carrier recovery circuit as claimed in claim 6 and wherein said delay means is adjustable in dependence on the bandwidth of said filter means.

* * * * *